Sept. 3, 1940.   H. A. CLARK ET AL   2,213,335
CLEANER AND STERILIZER FOR CONTAINERS
Filed July 11, 1936   2 Sheets-Sheet 1

INVENTORS
Howard A. Clark, Frederick W. Miller,
Alfred C. Fowler, Christian L. Anderson
and Julian B. Brenner
BY M. Y. Charles
ATTORNEY.

Sept. 3, 1940.  H. A. CLARK ET AL  2,213,335
CLEANER AND STERILIZER FOR CONTAINERS
Filed July 11, 1936  2 Sheets-Sheet 2
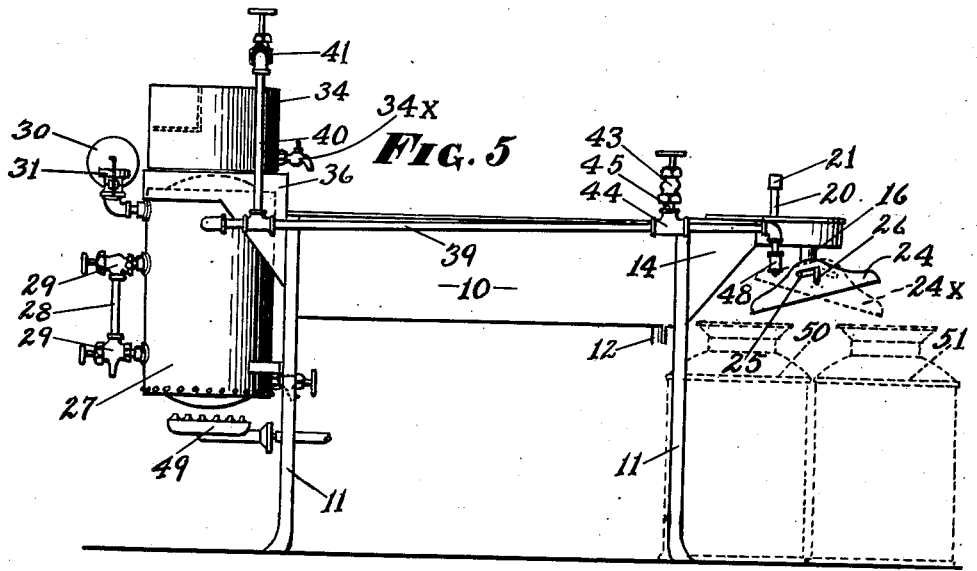
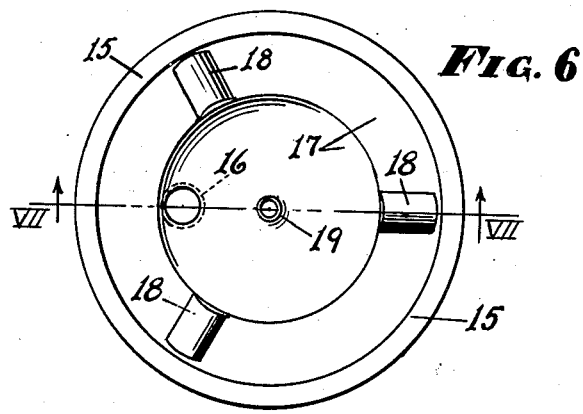
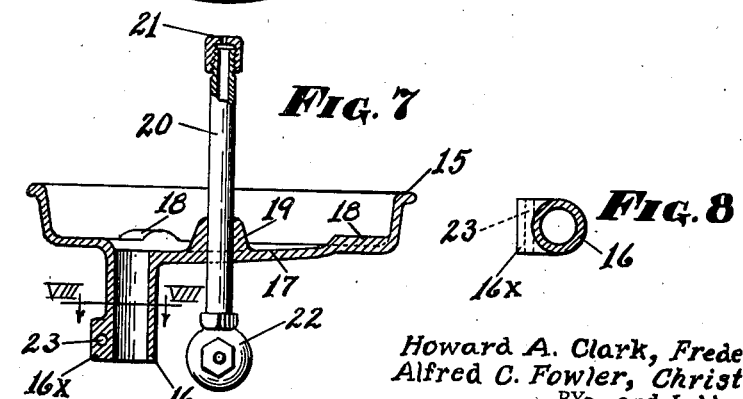
INVENTORS.
Howard A. Clark, Frederick W. Miller,
Alfred C. Fowler, Christian L. Anderson
BY and Julian B. Brenner
M. Y. Charles
ATTORNEY.

Patented Sept. 3, 1940

2,213,335

UNITED STATES PATENT OFFICE 2,213,335

CLEANER AND STERILIZER FOR CONTAINERS

Howard A. Clark, Frederick W. Miller, Alfred C. Fowler, Christian L. Anderson, and Julian B. Brenner, Clay Center, Kans.

Application July 11, 1936, Serial No. 90,133

2 Claims. (Cl. 141—7)

Our invention relates to cleaners and sterilizers for containers such as milk or cream cans or the like. The object of our invention is to provide a device of the kind mentioned, in which, after cream has been emptied out of a cream can, the cream still clinging to the walls of the can may be removed by placing the can upside down on our apparatus and injecting live steam under high pressure into the can, whereupon the cream is heated to a point where it will soften and drain from the can.

A still further object is to provide a device of the kind mentioned in which the drainage from the can may be directed into any one of a plurality of receiving containers.

Another object is to provide a device of the kind mentioned in which there is a tank containing water in which containers may be washed, also provision is made for the controlled heating of the water.

A still further object is to provide a device of the kind described, in which provision is made for heating of water to be used in the process of testing cream, also provision is made for warming of sample and test bottles.

These and other objects will be more fully explained as this description progresses.

Figure 1:
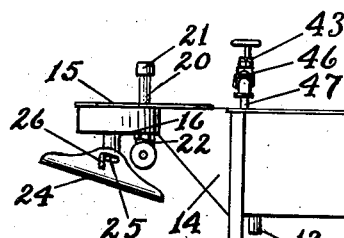
Figure 2:
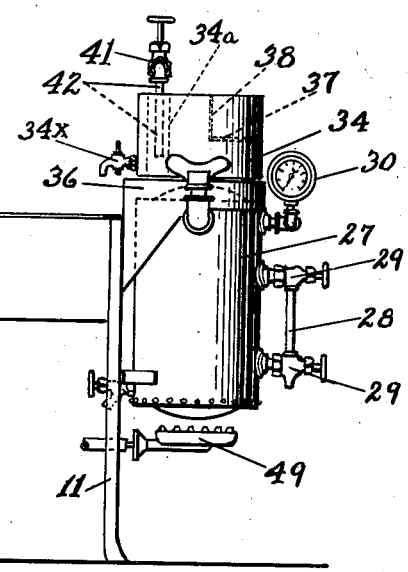
Figure 2:
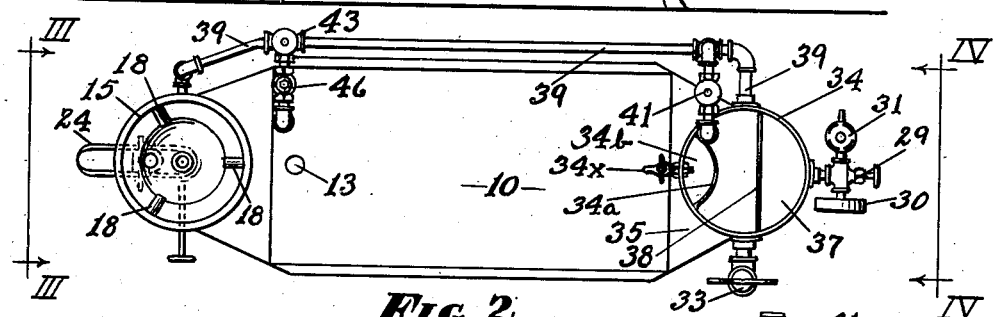
Figure 3:
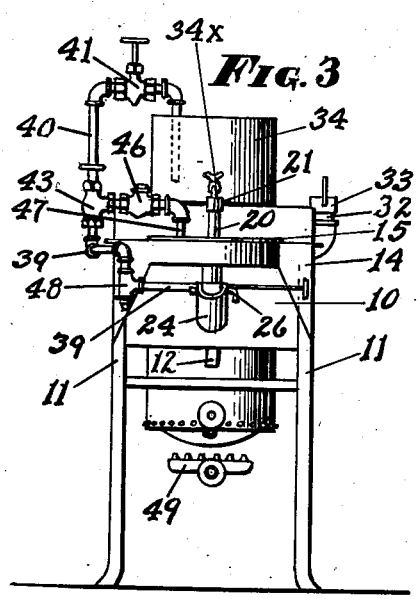
Figure 4:
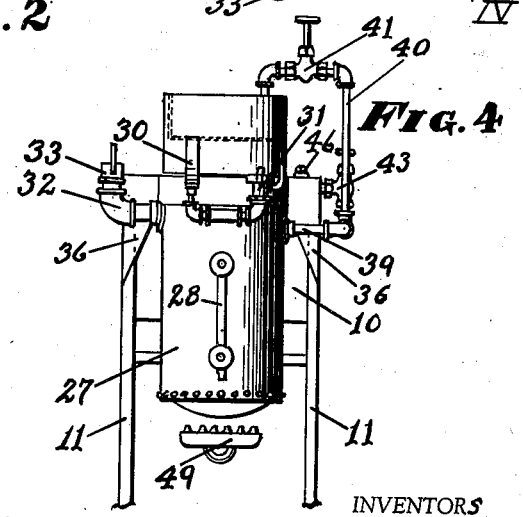

Now referring to the accompanying drawings Fig. 1 represents a front view of our device. Fig. 2 is a plan view of Fig. 1. Fig. 3 is an end view as seen from the line III—III in Fig. 2. Fig. 4 is an end view as seen from the line IV—IV in Fig. 2. Fig. 5 is a rear view of the machine. Fig. 6 is a plan view of the drain element employed in the device. Fig. 7 is a sectional view through the drain element as seen from the line VII—VII in Fig. 6. Fig. 8 is a sectional view through the drainage spout as seen from the line VIII—VIII in Fig. 7.

Similar numerals of reference designate the same parts throughout the several figures of the drawings.

In the drawings is shown a tank 10 which is supported on legs 11. The tank is provided with a drainage spout 12 which may be closed by a rubber stopper 13. At 14 is shown a supporting element on the device, in which is detachably supported a drainage element 15. The drainage element 15 is pan shape and is provided with a drainage spout 16 and is integral with the bottom 17 which slopes or drains to the spout 16. Around the outer portions of the bottom 17 are raised elements 18, upon which a cream can may rest so as to support the can above the bottom 17 for drainage purposes. At 19 is an upwardly projecting boss through which passes a steam pipe 20 on the upper end of which is a steam jet 21 The lower end of the pipe 20 is threaded into a control valve 22. On the lower end of the spout element 16 is an outwardly extending block like element 16x, having a horizontally positioned hole 23 therein.

At 24 is a tiltable trough like element which is open at each end and is provided with duplicate sides in which there are slots 25. At 26 is a pin element passing through the slots 25 and the hole 23 in the block element 16x which forms a pivotal mounting for the spout 24 on the drainage element and by sliding the spout element 24 back and forth on the pin element 26, gravity will cause the spout element 24 to stand in an inclined position as shown in Fig. 5, or in an oppositely inclined position as shown by the dotted lines 24x in Fig. 5. The object of this tilting arrangement will be later explained.

At the opposite end of the tank 10 and supported by suitable brackets and frame work, is a boiler 27, which is provided with a water glass 28 and suitable valve equipment 29, a steam pressure gauge 30, a safety valve 31, and a water supply pipe 32, having a removable cap 33 thereon.

Above the boiler 27 is a tank 34 that is removably supported on a platform 35 and bracket elements 36 that are carried on the frame work of the device as shown.

In the tank 34 is a shelf like element 37 having a short upturned flange like portion 38 to form a compartment in which sample bottles may be heated.

At 34a is a partition wall in the tank 34 forming a compartment 34b in which hot water may be kept for cream testing purposes. At 34x is a valve opening into the hot water tank by which hot water may be drained therefrom.

At 39 is a pipe line connected to the boiler 27 and extending in an inclined position along the rear of the device and terminating in or connected to the control valve 22.

At 40 is a pipe connecting into the pipe line 39 and supplying steam to the valve 41. At 42 is a flexible tubular element connecting with the valve 41 and extending downwardly and which may be positioned in the tank 34 or the compartment 34b, the object of which will be later explained. At 43 is another valve supplied with steam from the pipe line 39 through the T-fitting 44 and pipe 45. At 46 is a check valve connecting with the valve 43 and feeding to a pipe 47, which extends downwardly into the tank 10. At 48 is a vertically positioned T-fitting in the pipe line 39, the object of which will be later explained. The lower end of the T-fitting 48 is provided with a closure plug as will be readily understood.

The pipe line 39 is inclined so that any condensation therein will drain back in the boiler 27 and the plug in the T-fitting 48 may be removed therefrom, whereupon any condensation from the pipe line that does not drain back into the boiler will drain out through the lower end of the T-fitting 48.

At 49 is shown a gas burner positioned below the boiler 27 for furnishing heat to raise the steam pressure in the boiler.

While the burner shown in the drawings is a gas burner, it will be understood that the burner may be any other kind of a burner or any other kind of a device that will supply suitable heat to the boiler 27.

In using the device, water is placed in the boiler 27, after which the boiler is sealed by the cap 33 and heat is applied to the boiler until the desired steam pressure is raised therein. The tanks 10 and 34 and 34b are supplied with water so that the level of the water rises above the ends of the tubular element 42 and the pipe 47, whereupon the valves 41 and 43 may be opened and the steam from the boiler 27 will be jetted into the water, thereby heating the water. When the water has reached the desired temperature, the valves may be closed to prevent further heating of the water in the tanks.

Cream cans as shown in dotted lines at 50 and 51 in Fig. 5 are set on the floor in such a position that the spout 24 will drain into the can 50 or the spout 24 may be tilted as shown in dotted lines 24x so that it will drain into the can 51.

In receiving cream at a cream station, the first thing to be done is to take a sample of cream from which to make the test. Those skilled in the art of testing cream readily know and understand the use of sample bottles and test bottles, and the value of having water heated to the proper temperature for use in making the cream test. They also know that warmed test bottles and sample bottles and a warm sample of cream therein, materially facilitates a correct cream test. In view of this, in our machine, we have made provision for heating of the items, i. e., in the tank 34, the shelf 37 is provided for the support of sample bottles in the heated water in such a position that their tops are above the water line. The long necked test bottles and test cream therein may be set on the floor of the intermediate portion of the tank 34 so that the upper ends of the test bottles will also be positioned above the water line. The compartment 34b is provided to hold the supply of hot water for testing purposes, etc.

At the proper time, the customer's cream can is turned upside down on the drainage element 15 and is supported on the upwardly projecting elements 18 of the drainage element 15, so that the pipe 20 projects into the customer's cream can, whereupon the valve 22 is opened, and live steam under pressure is jetted through the steam jet 21 into the customer's cream can. The heat from the steam and the condensation therefrom will melt and rinse the cream that remained therein, from the cream can that did not drain out at the time that the customer's cream can was first emptied. This drainage will be caught in the drainage element 15 and will drain through the drainage tube 16 into the drainage spout 24 and then into the cream can 50, whereupon the customer's cream can may be removed from the drainage element 15 and laid in the tank 10 in which the can may be washed by hand, both inside and outside. At this point the drainage spout 24 is changed to the dotted position 24x and the customer's cream can is again placed on the drainage element 15 and live steam under pressure is again jetted into the cream can, thereby raising the cream can to a high temperature, and when the jetting of the steam into the cream can is discontinued, the condensation and dirty water drained therefrom has drained into the can 51 and the stored heat in the can will cause any moisture either inside or outside of the can to evaporate and leave the can in a clean, sterile condition and ready for the customer's use again.

Such modifications may be employed as lie within the scope of the appended claims, without departing from the spirit and intention of the invention. Now having fully described our invention, what we claim as new and desire to secure by Letters Patent is:

1. In a container cleansing and sterilizing device built as a unit, said device being supported on legs and comprising in combination a cleansing tank positioned between said legs, a steam boiler carried on a bracket attached to a pair of said legs and located at one end of said cleaning tank, a drainage element carried on a bracket attached to a second pair of said legs and located at the other end of said cleansing tank, a second tank positioned on top of said steam boiler so as to receive heat from said steam boiler, and a heating unit under said boiler for heating the boiler, and means connected with said boiler for supplying steam to each of said tanks and said drainage element, and means for controlling the flow of steam to each of said tanks and drainage element independent of the other.

2. In a container cleansing and sterilizing device built as a unit, said device being supported on legs and comprising in combination a cleansing tank positioned between said legs, a steam boiler carried on a bracket attached to a pair of said legs and located at one end of said cleaning tank, a drainage element carried on a bracket attached to a second pair of said legs and located at the other end of said cleansing tank, a second tank positioned on top of said steam boiler so as to receive heat from said steam boiler, and a heating unit under said boiler for heating the boiler, and means connected with said boiler for supplying steam to each of said tanks and said drainage element, and means for controlling the flow of steam to each of said tanks and drainage element independent of the other, said drainage element being cup shaped and having a drainage tube for draining said drainage element, and a double ended spout, said spout being slidably mounted on pivotal points on said drainage tube so that the spout may be slid to overbalancing positions so as to make the spout stand in selected inclined positions so as to determine which end of the spout will discharge the drainage from the drainage spout as and for the purpose described.

HOWARD A. CLARK.
FREDERICK W. MILLER.
ALFRED C. FOWLER.
CHRISTIAN L. ANDERSON.
JULIAN B. BRENNER.